United States Patent
Li et al.

(10) Patent No.: US 9,458,315 B2
(45) Date of Patent: Oct. 4, 2016

(54) FLAME RETARDANT THERMOPLASTIC POLYCARBONATE COMPOSITIONS AND FILMS MADE THEREFROM

(75) Inventors: Ying Li, Shanghai (CN); Yuzhen Xu, Shanghai (CN); Niles Rosenquist, Evansville, IN (US); Jian Yang, Shanghai (CN); Dake Shen, Shanghai (CN)

(73) Assignee: SABIC GLOBAL TECHNOLOGIES B.V. (NL)

( * ) Notice: Subject to any disclaimer, the term of this patent is extended or adjusted under 35 U.S.C. 154(b) by 21 days.

(21) Appl. No.: 12/546,874

(22) Filed: Aug. 25, 2009

(65) Prior Publication Data

US 2011/0052895 A1 Mar. 3, 2011

(51) Int. Cl.
| | |
|---|---|
| C08K 5/41 | (2006.01) |
| C08K 5/52 | (2006.01) |
| B32B 27/00 | (2006.01) |
| C08L 69/00 | (2006.01) |
| C08K 3/24 | (2006.01) |
| C08K 3/34 | (2006.01) |
| C08K 5/42 | (2006.01) |
| C08K 5/526 | (2006.01) |
| C08L 27/18 | (2006.01) |
| C08L 83/10 | (2006.01) |

(52) U.S. Cl.
CPC ............... *C08L 69/00* (2013.01); *C08K 3/24* (2013.01); *C08K 3/346* (2013.01); *C08K 5/42* (2013.01); *C08K 5/526* (2013.01); *C08L 27/18* (2013.01); *C08L 83/10* (2013.01)

(58) Field of Classification Search
USPC ................ 524/127, 140, 141, 165
See application file for complete search history.

(56) References Cited

U.S. PATENT DOCUMENTS

| | | | |
|---|---|---|---|
| 4,154,775 A | 5/1979 | Axelrod | |
| 4,746,701 A | 5/1988 | Kress et al. | |
| 5,449,710 A * | 9/1995 | Umeda et al. | 524/165 |
| 5,608,027 A | 3/1997 | Crosby et al. | |
| 7,019,059 B2 * | 3/2006 | Lin et al. | 524/165 |
| 7,060,780 B2 | 6/2006 | Miyamoto et al. | |
| 7,160,937 B2 | 1/2007 | Shibuya et al. | |
| 7,183,342 B2 | 2/2007 | Miyamoto et al. | |
| 7,223,804 B2 * | 5/2007 | An et al. | 524/165 |
| 7,462,662 B2 | 12/2008 | Balfour et al. | |
| 7,652,083 B2 * | 1/2010 | Mullen | 524/108 |
| 7,709,562 B2 * | 5/2010 | Li et al. | 524/108 |
| 7,799,855 B2 * | 9/2010 | Ebeling et al. | 524/127 |
| 2005/0182165 A1 | 8/2005 | Ma et al. | |
| 2006/0287422 A1 * | 12/2006 | Volkers | C08K 3/24 524/417 |
| 2007/0231576 A1 * | 10/2007 | Davis et al. | 428/412 |
| 2007/0232739 A1 | 10/2007 | Volkers et al. | |
| 2007/0232744 A1 | 10/2007 | Volkers et al. | |
| 2007/0257401 A1 | 11/2007 | Nakagawa et al. | |
| 2008/0063861 A1 * | 3/2008 | Shibuya | C08K 5/09 428/339 |
| 2010/0168295 A1 * | 7/2010 | Breiner et al. | 524/127 |

FOREIGN PATENT DOCUMENTS

| | | |
|---|---|---|
| EP | 0174752 A2 | 3/1986 |
| JP | 2005105206 A | 4/2005 |
| JP | 2006316149 A | 11/2006 |
| JP | 2007153983 A | 6/2007 |

OTHER PUBLICATIONS

Japanese Publication No. 2005048048, published Feb. 24, 2005, Abstract Only, 1 page.
Japanese Publication No. 2005068272, published Mar. 17, 2005, Abstract Only, 1 page.
Japanese Publication No. 2005105206, published Apr. 21, 2005, Abstract Only, 1 page.
Japanese Publication No. 2006008744, published Jan. 12, 2006, Abstract Only, 1 page.
Japanese Publication No. 2008222852, Published Sep. 25, 2008, Abstract Only , 1 page.
International Search Report; International Application No. PCT/US2010/046445; International Filing Date: Aug. 24, 2010; Date of Mailing: Dec. 6, 2010; 4 Pages.
Written Opinion of the International Searching Authority; International Application No. PCT/US2010/046445; International Filing Date: Aug. 24, 2010; Date of Mailing: Dec. 6, 2010; 5 Pages.
UL94, Tests for Flammability of Plastic Materials for Parts in Devices and Appliances, revised Dec. 12, 2003, 52 pages.

* cited by examiner

*Primary Examiner* — Randy Gulakowski
*Assistant Examiner* — Christopher M Rodd
(74) *Attorney, Agent, or Firm* — Cantor Colburn LLP

(57) ABSTRACT

Described herein is a thermoplastic composition comprising a polycarbonate, a mineral filler, inorganic acid or acid salt, an anti-drip agent, and a flame retardant comprising a perfluoroalkyl sulfonate salt or a combination of an aromatic phosphate ester and a polycarbonate-siloxane block copolymer.

16 Claims, No Drawings

FLAME RETARDANT THERMOPLASTIC POLYCARBONATE COMPOSITIONS AND FILMS MADE THEREFROM

BACKGROUND

Polycarbonate (PC) is widely used in film extrusion for electrical and electronic (EE) insulation applications. This film shows excellent mechanical properties, high temperature resistance, and offers ease of thermoforming, die cutting, folding and bending. For EE applications, high flame retardant properties are required. With increasingly stricter regulations on brominated material and environmental protection, current EE marketing trend demands chlorine and bromine free EE film. Additionally, the flame retardant polycarbonate is demanded to have similar performance with previous brominated PC, especially in FR performance: V0/VTM0 at 2 mil-20 mil (0.05 millimeters (mm) to 0.5 mm). Accordingly there is a need for a flame retardant polycarbonate material, free of bromine and chlorine flame retardants, which can achieve a V0 or VTM0 flame retardant rating as determined by UL94 at a thickness of 0.05 mm to 0.5 mm.

BRIEF DESCRIPTION

Described herein is a thermoplastic composition comprising a polycarbonate, a mineral filler, inorganic acid or acid salt, an anti-drip agent and a flame retardant comprising a perfluoroalkyl sulfonate salt or a combination of an aromatic phosphate ester and a polycarbonate-siloxane block copolymer.

DETAILED DESCRIPTION OF THE INVENTION

A thermoplastic composition comprising a polycarbonate resin, a mineral filler, an inorganic acid or an acid salt, an anti-drip agent and a flame retardant comprising a perfluoroalkyl sulfonate salt or a combination of an aromatic phosphate ester and a polycarbonate-siloxane block copolymer has been found to exhibit improved flame retardance, mechanical properties and other characteristics and less degradation than thermoplastic compositions without the acid or acid salt, thermoplastic compositions without the mineral filler, and thermoplastic compositions which use other flame retardants.

The thermoplastic composition can have a flame retardance rating of V0 at a thickness of 0.43 millimeters according to UL94. The thermoplastic composition can also have a flame retardance rating of V0 at a thickness of 0.38 millimeters according to UL94. The thermoplastic composition can have a flame retardance rating of VTM0 at a thickness of 0.17 millimeters according to UL94.

The thermoplastic composition can have a notched Izod impact strength greater than or equal to 1000 Joules/meter according to ASTM D256 at 23 degrees Celsius.

The thermoplastic composition can have a heat distortion temperature greater than or equal to 130 degrees Celsius according to ASTM D648.

As used herein, the terms "polycarbonate" and "polycarbonate resin" mean compositions having repeating structural carbonate units of the formula (1):

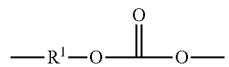

in which at least about 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction or melt reaction of dihydroxy compounds having the formula HO—$R^1$—OH, which includes dihydroxy compounds of formula (3)

wherein $Y^1$, $A^1$ and $A^2$ are as described above. Also included are bisphenol compounds of general formula (4):

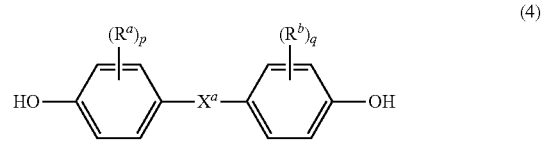

wherein $R^a$ and $R^b$ each represent a halogen atom or a monovalent hydrocarbon group and may be the same or different; p and q are each independently integers of 0 to 4; and $X^a$ represents one of the groups of formula (5):

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, hydroquinone, 4,4'-dihydroxybiphenyl, 1,6-dihydroxynaphthalene, 2,6-dihydroxynaphthalene, bis(4-hydroxyphenyl) methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 1,1-bis (hydroxyphenyl)cyclopentane, 1,1-bis(4-hydroxyphenyl) cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl) adamantine, (alpha,alpha'-bis(4-hydroxyphenyl)toluene, bis (4-hydroxyphenyl)acetonitrile, 2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl) phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds that may be represented by formula (3) include 1,1-bis(4-hydroxyphenyl)methane, 1,1-bis(4-hydroxyphenyl)ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane. Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane (THPE), isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl)phenol), 4-chloroformyl phthalic anhydride, trimesic acid, and benzophenone tetracarboxylic acid. The branching agents may be added at a level of about 0.05 wt. % to about 2.0 wt. %. All types of polycarbonate end groups are contemplated as being useful in the polycarbonate composition, provided that such end groups do not significantly affect desired properties of the thermoplastic compositions.

"Polycarbonates" and "polycarbonate resins" as used herein further includes blends of polycarbonates with other copolymers comprising carbonate chain units. A specific suitable copolymer is a polyester carbonate, also known as a copolyester-polycarbonate. Such copolymers further contain, in addition to recurring carbonate chain units of the formula (1), repeating units of formula (6)

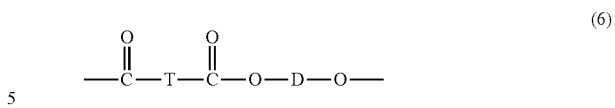

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

wherein each $R^f$ is independently a $C_{1-10}$ hydrocarbon group and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In one specific embodiment, the polycarbonate is a linear homopolymer derived from bisphenol A, in which each of $A^1$ and $A^2$ is p-phenylene and $Y^1$ is isopropylidene.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-188}$ aryloxy group. An effective amount of a phase transfer catalyst may be about 0.1 to about 10 wt. % based on the weight of bisphenol in the phosgenation mixture. In another embodiment an effective amount of phase transfer catalyst may be about 0.5 to about 2 wt. % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

The polycarbonate resins may also be prepared by interfacial polymerization. Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example, instead of using isophthalic acid, terephthalic acid, or mixtures thereof, it is possible to employ isophthaloyl dichloride, terephthaloyl dichloride, and mixtures thereof.

Blends and/or mixtures of more than one polycarbonate may also be used. For example, a high flow and a low flow polycarbonate may be blended together.

Polycarbonate can be present in an amount of 80 to 95 weight percent, based on the total weight of the composition.

The composition also includes at least one mineral filler. A non-exhaustive list of examples of mineral fillers suitable for use in the composition include talc including fibrous, modular, needle shaped, lamellar talc, or the like; mica; wollastonite; silicates and silica powders such as aluminum silicate (mullite), synthetic calcium silicate, zirconium silicate, crystalline silica graphite, natural silica sand, or the like; boron powders such as boron-nitride powder, boronsilicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; glass spheres such as hollow and solid glass spheres, silicate spheres, cenospheres, aluminosilicate (armospheres), or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like. Combinations of fillers may also be used. In some instances the mineral filler is talc. As used herein, the term "mineral filler" includes any synthetic and naturally occurring reinforcing agents for polycarbonates and polycarbonate blends that can be combined with an acid or acid salt for a synergistic effect that produces balanced physical properties and does not degrade the polycarbonate or polycarbonate blend.

The mineral filler can have an average particle size of less than or equal to 5.0 micrometer, or, more specifically less than or equal to 3.0 micrometers, or, even more specifically, less than or equal to 2.0 micrometers. More specifically, the mineral filler can be talc having an average particle size of less than or equal to 5.0 micrometer, or, more specifically less than or equal to 3.0 micrometers, or, even more specifically, less than or equal to 2.0 micrometers.

The mineral filler can be present in an amount of 3 to 7 weight percent, based on the total weight of the composition. Within this range the amount of mineral filler can be greater than or equal to 4 weight percent. Also within this range the amount of mineral filler can be less than or equal to 6 weight percent.

The composition also includes an acid or an acid salt. The acid or acid salt is an inorganic acid or inorganic acid salt. The acid can be an acid comprising a phosphorous containing oxy-acid.

A phosphorous containing oxy-acid is a multi-protic phosphorus containing oxy-acid having the general formula (8):

$$H_mP_tO_n \qquad (8)$$

where m and n are each 2 or greater and t is 1 or greater.

Examples of the acids of formula (8) include, but are not limited to, acids represented by the following formulas: $H_3PO_4$, $H_3PO_3$, and $H_3PO_2$. In some embodiments, the acid will include one of the following: phosphoric acid, phosphorous acid, hypophosphorous acid, hypophosphoric acid, phosphinic acid, phosphonic acid, metaphosphoric acid, hexametaphosphoric acid, thiophosphoric acid, fluorophosphoric acid, difluorophosphoric acid, fluorophosphorous acid, difluorophosphorous acid, fluorohypophosphorous acid, or fluorohypophosphoric acid. Alternatively, acids and acid salts, such as, for example, sulphuric acid, sulphites, mono zinc phosphate, mono calcium phosphate, mono natrium phosphate, and the like, may be used. The acid or acid salt is preferably selected so that it can be effectively combined with the mineral filler to produce a synergistic effect and a balance of properties, such as flow and impact, in the polycarbonate or polycarbonate blend.

The weight ratio of acid or acid salt to mineral filler can be 0.01 to 0.04. In compositions comprising an aromatic phosphate ester the weight ratio of acid or acid salt to mineral filler can be 0 to 0.03, or, more specifically, 0.0001 to 0.03.

Anti-drip agents include a fibril forming or non-fibril forming fluoropolymer such as polytetrafluoroethylene (PTFE). The anti-drip agent may be encapsulated by a rigid copolymer as described above, for example SAN. PTFE encapsulated in SAN is known as TSAN. Encapsulated fluoropolymers may be made by polymerizing the encapsulating polymer in the presence of the fluoropolymer, for example, in an aqueous dispersion. TSAN may provide significant advantages over PTFE, in that TSAN may be more readily dispersed in the composition. A suitable TSAN may comprise, for example, about 50 wt. % PTFE and about 50 wt. % SAN, based on the total weight of the encapsulated fluoropolymer. The SAN may comprise, for example, about 75 wt. % styrene and about 25 wt. % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer.

The anti-drip agent is present in an amount of 0.10 to 0.50 weight percent, based on the total weight of the composition. Within this range the anti-drip agent can be present in an amount greater than or equal to 0.20, or, more specifically, greater than or equal to 0.30. Also within this range the anti-drip agent can be present in an amount less than or equal to 0.45.

The flame retardant comprises a perfluoroalkyl sulfonate salt or a combination of an aromatic phosphate ester and a polycarbonate-polysiloxance copolymer.

Perfluoroalkyl sulfonate salts include salts of $C_{2-16}$ alkyl sulfonate salts such as potassium perfluorobutane sulfonate (Rimar salt), potassium perfluoroctane sulfonate, and tetraethylammonium perfluorohexane sulfonate.

The perfluoroalkyl sulfonate salt can be present in an amount of 0.30 to 1.00 weight percent, based on the total weight of the composition. Within this range the perfluoroalkyl sulfonate salt can be present in an amount greater than or equal to 0.40, or, more specifically, greater than or equal to 0.45 weight percent. Also within this range the perfluoroalkyl sulfonate salt can be present in an amount less than or equal to 0.80, or, more specifically, less than or equal to 0.70.

Aromatic phosphate esters include esters of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl)phenyl phosphate, tri(nonylphenyl) phosphate, bis(dodecyl) p-tolyl phosphate, dibutyl phenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

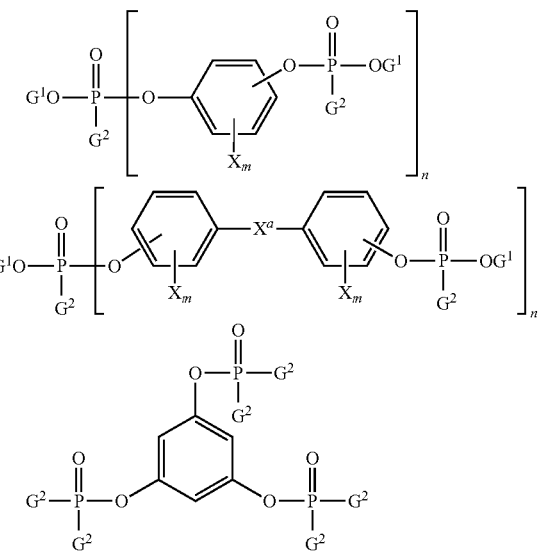

wherein each $G^1$ is independently a hydrocarbon having 1 to about 30 carbon atoms; each $G^2$ is independently a hydrocarbon or hydrocarbonoxy having 1 to about 30 carbon atoms; each $X^a$ is as defined above; each X is independently a hydrogen; m is 0 to 4, and n is 1 to about 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

The aromatic phosphate ester can be present in an amount of 6 to 12 weight percent, based on the total weight of the composition. Within this range the aromatic phosphate ester can be present in an amount greater than or equal to 8, Also within this range the aromatic phosphate ester can be present in an amount less than or equal to 10.

A polycarbonate-polysiloxane copolymer comprises polycarbonate blocks and polydiorganosiloxane blocks. The polycarbonate blocks in the copolymer comprise repeating structural units of formula (1) as described above, for example wherein $R^1$ is of formula (2) as described above. These units may be derived from reaction of dihydroxy compounds of formula (3) as described above. In one embodiment, the dihydroxy compound is bisphenol A, in which each of $A^1$ and $A^2$ is p-phenylene and $Y^1$ is isopropylidene.

The polydiorganosiloxane blocks comprise repeating structural units of formula (17) (sometimes referred to herein as 'siloxane'):

(17)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer.

The value of D in formula (17) may vary widely depending on the type and relative amount of each component in the thermoplastic composition, the desired properties of the composition, and like considerations. Generally, D may have an average value of 2 to about 1000, specifically about 2 to about 500, more specifically about 5 to about 100. In one embodiment, D has an average value of about 10 to about 75, and in still another embodiment, D has an average value of about 40 to about 60. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer.

A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of formula (18):

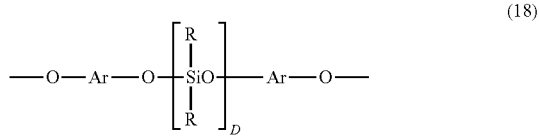

(18)

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (9) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarlyene compounds are 1,1-bis(4-hydroxyphenyl)methane, 1,1-bis(4-hydroxyphenyl)ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl)cyclohexane, bis(4-hydroxyphenyl sulphide), and 1,1-bis(4-hydroxy-t-butylphenyl) propane. Combinations comprising at least one of the foregoing dihydroxy compounds may also be used.

Such units may be derived from the corresponding dihydroxy compound of the following formula (19):

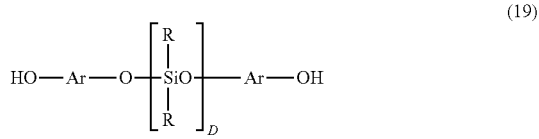

(19)

wherein Ar and D are as described above. Such compounds are further described in U.S. Pat. No. 4,746,701 to Kress et al. Compounds of this formula may be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (20):

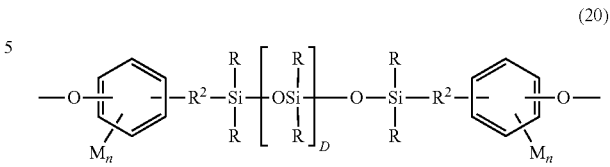

(20)

wherein R and D are as defined above. $R^2$ in formula (20) is a divalent $C_2$-$C_8$ aliphatic group. Each M in formula (20) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is hydrogen, an alkyl group such as methyl, ethyl, or propyl, an alkoxy group such as methoxy, ethoxy, or propoxy, or an aryl group such as phenyl or tolyl; $R^2$ is a dimethylene, trimethylene or tetramethylene group; and R is a $C_{1-8}$ alkyl, cyanoalkyl, or aryl such as phenyl. In another embodiment, R is methyl, or a mixture of methyl and or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (21):

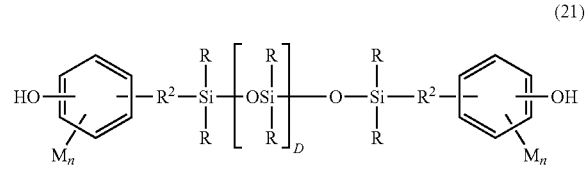

(21)

wherein R, D, M, $R^2$, and n are as described above.

Such dihydroxy polysiloxanes can be made by effecting a platinum catalyzed addition between a siloxane hydride of the formula (22),

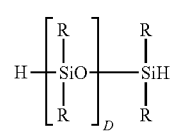

(22)

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-t-butoxyphenol, 4-phenyl-2-phenylphenol, 2-methyl-4-propylphenol, 2-allyl-4,6-dimethylphenol, 2-allyl-6-methoxy-4-methylphenol and 2-allyl-4,6-dimethylphenol. Mixtures comprising at least one of the foregoing may also be used.

The polycarbonate-polysiloxane copolymer may be manufactured by reaction of diphenolic polysiloxane (21) with a carbonate source and a dihydroxy aromatic compound of formula (3), optionally in the presence of a phase transfer catalyst as described above. Suitable conditions are similar to those useful in forming polycarbonates. For example, the copolymers are prepared by phosgenation, at temperatures from below 0° C. to about 100° C., preferably about 25° C. to about 50° C. Since the reaction is exothermic, the rate of phosgene addition may be used to control the reaction temperature. The amount of phosgene required will generally depend upon the amount of the dihydric reactants.

Alternatively, the polycarbonate-polysiloxane copolymers may be prepared by co-reacting in a molten state, the dihydroxy monomers and a diaryl carbonate ester, such as diphenyl carbonate, in the presence of a transesterification catalyst as described above.

In the production of the polycarbonate-polysiloxane copolymer, the amount of dihydroxy polydiorganosiloxane is selected so as to provide the desired amount of polydiorganosiloxane units in the copolymer. The amount of polydiorganosiloxane units may vary widely, i.e., may be about 1 wt. % to about 99 wt. % of polydimethylsiloxane, or an equivalent molar amount of another polydiorganosiloxane, with the balance being carbonate units. The particular amounts used will therefore be determined depending on desired physical properties of the thermoplastic composition, the value of D (within the range of 2 to about 1000), and the type and relative amount of each component in the thermoplastic composition, including the type and amount of polycarbonate, type and amount of impact modifier, type and amount of polycarbonate-polysiloxane copolymer, and type and amount of any other additives. Suitable amounts of dihydroxy polydiorganosiloxane can be determined by one of ordinary skill in the art without undue experimentation using the guidelines taught herein. For example, the amount of dihydroxy polydiorganosiloxane may be selected so as to produce a copolymer comprising about 1 wt. % to about 75 wt. %, or about 1 wt. % to about 50 wt. % polydimethylsiloxane, or an equivalent molar amount of another polydiorganosiloxane. In one embodiment, the copolymer comprises about 5 wt. % to about 40 wt. %, optionally about 5 wt. % to about 25 wt. % polydimethylsiloxane, or an equivalent molar amount of another polydiorganosiloxane, with the balance being polycarbonate. In a particular embodiment, the copolymer may comprise about 20 wt. % siloxane.

The polycarbonate-polysiloxane copolymer can be present in an amount of 5 to 20 weight percent, based on the total weight of the composition. Within this range the polycarbonate-polysiloxane copolymer can be present in an amount greater than or equal to 7. Also within this range the polycarbonate-polysiloxane copolymer can be present in an amount less than or equal to 15.

Other fillers and/or reinforcing agents may be used if desired, as long as they do not further degrade the composition. For example, optional fillers and reinforcing agents include reinforcing organic fibrous fillers formed from organic polymers capable of forming fibers such as poly (ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like.

The compositions described herein may comprise a primary antioxidant or "stabilizer" (e.g., a hindered phenol and/or secondary aryl amine) and, optionally, a secondary antioxidant (e.g., a phosphate and/or thioester). Suitable antioxidant additives include, for example, organophosphites such as tris(nonyl phenyl)phosphite, tris(2,4-di-t-butyl-phenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 to about 1 parts by weight, optionally about 0.05 to about 0.5 parts by weight, based on 100 parts by weight polycarbonate resin, and any optional aromatic vinyl copolymer and/or impact modifier.

Suitable heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of about 0.01 to about 5 parts by weight, optionally about 0.05 to about 0.3 parts by weight, based on 100 parts by weight of polycarbonate resin, and any optional aromatic vinyl copolymer and/or impact modifier.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 0.01 to about 10 parts by weight, optionally about 0.1 to about 1 parts by weight, based on 100 parts by weight of polycarbonate resin, aromatic vinyl copolymer and/or impact modifier.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl) oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 to about 5 parts by weight, based on 100 parts by weight of polycarbonate resin, and any optional aromatic vinyl copolymer and/or impact modifier.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials are generally used in amounts of about 0.1 to about 20 parts by weight, optionally about 1 to about 10 parts by weight, based on 100 parts by weight of the polycarbonate resin, and any optional aromatic vinyl copolymer and/or impact modifier.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides, polyether-polyamide (polyetheramide) block copolymers, polyetheresteramide block copolymers, polyetheresters, or polyurethanes, each containing polyalkylene glycol moieties such as polyethylene glycol, polypropylene glycol, polytetramethylene glycol, and the like. Such polymeric antistatic agents are commercially available, such as, for example, Pelestat™ 6321 (Sanyo), Pebax™ MH1657 (Atofina), and Irgastat™ P18 and P22 (Ciba-Geigy). Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of about 0.1 to about 10 parts by weight, based on 100 parts by weight of polycarbonate resin, and any optional aromatic vinyl copolymer and/or impact modifier.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.01 to about 10 parts by weight, based on 100 parts by weight of polycarbonate resin, and any optional aromatic vinyl copolymer and/or impact modifier.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes are generally used in amounts of about 0.1 to about 10 ppm, based on the weight of polycarbonate resin, and any optional aromatic vinyl copolymer and/or impact modifier.

Where a foam is desired, suitable blowing agents include, for example, low boiling halohydrocarbons and those that generate carbon dioxide; blowing agents that are solid at room temperature and when heated to temperatures higher than their decomposition temperature, generate gases such as nitrogen, carbon dioxide or ammonia gas, such as azodicarbonamide, metal salts of azodicarbonamide, 4,4'oxybis (benzenesulfonylhydrazide), sodium bicarbonate, ammonium carbonate, or the like; or combinations comprising at least one of the foregoing blowing agents.

The thermoplastic compositions may be manufactured by methods generally available in the art, for example, powdered polycarbonate resin, mineral filler, acid or acid salt, are first blended, optionally with other fillers in a Henschel™ high speed mixer or other suitable mixer/blender. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Such additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

The thermoplastic composition may be converted to articles using common thermoplastic processes such as film and sheet extrusion, injection molding, gas-assist injection molding, extrusion molding, compression molding and blow molding. Film and sheet extrusion processes may include and are not limited to melt casting, blown film extrusion and calendering. Co-extrusion and lamination processes may be employed to form composite multi-layer films or sheets. Single or multiple layers of coatings may further be applied to the single or multi-layer substrates to impart additional properties such as scratch resistance, ultra violet light resistance, aesthetic appeal, etc. Coatings may be applied through standard application techniques such as rolling, spraying, dipping, brushing, or flow-coating. Film and sheet may alternatively be prepared by casting a solution or suspension of the composition in a suitable solvent onto a substrate, belt or roll followed by removal of the solvent. The film may have a thickness of 0.1 to 0.5 millimeters.

The thermoplastic composition may be converted to multiwall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles.

Accordingly, another embodiment of the invention relates to articles, sheets and films prepared from the compositions above.

The compositions are further illustrated by the following non-limiting examples, which were prepared from the components set forth in Table 1.

TABLE 1

| Material | Description | Source |
| --- | --- | --- |
| PC-1 | BPA polycarbonate resin having a weight average molecular weight (Mw) of 36,500 as determined by gel permeation chromatography (GPC) using polycarbonate standards | SABIC Innovative Plastics |
| PC-2 | BPA polycarbonate resin having a weight average molecular weight (Mw) of 30,500 as determined by GPC using polycarbonate standards | SABIC Innovative Plastics |
| PC-3 | A branched BPA polycarbonate resin made using THPE as the branching agent | SABIC Innovative Plastics |
| PC-4 | BPA polycarbonate resin having a weight average molecular weight (Mw) of 22.000 as determined by GPC using polycarbonate standards | SABIC Innovative Plastics |
| PC-Si | A BPA polycarbonate-polysiloxane copolymer comprising about 20% by weight of siloxane, 80% by weight BPA and encapped with paracumyl phenol | SABIC Innovative Plastics |
| Cyclic siloxane | Octaphenylcyclo tetrasiloxane | |
| Talc 1 | Talc having a median particle size of 2.0 micrometers and commercially available as Talcron, grade MP 15-38 | Specialty Materials, Inc. |
| Talc 2 | Talc having an average particle size of 1.1 microns and commercially available as Jetfine 3CA | Luzenac |
| TSAN | PTFE (polytetrafluoroethylene) encapsulated in SAN (50% fluoropolymer) | SABIC Innovative Plastics |
| Rimar salt | Potassium perfluorobutane sulfonate | LANXESS (Shanghai) Trading Co., Ltd |
| KSS | Potassium diphenylsulfone sulfonate | SLOSS INDUSTRIES CORPORATION |
| NaTS | p-toluenesulfonic acid sodium salt | Arichem |
| Acid 1 | Phosphorous Acid ($H_3PO_3$) 45% acid in water | Quaron |
| Acid 2 | Mono Zinc Phosphate (Trade name Z21-82) | CFB Budenheim |

Each of sample compositions was prepared according to amounts shown in the respective tables. In each of the examples, the polycarbonate(s) was dry blended with the talc, acid, Rimar salt and additional components as indicated. The dry blend was melt mixed using a twin screw extruder. The extrudate was pelletized and molded into the desired form. Films of varying thicknesses were extruded on a film extrusion line. The films ranged in thicknesses from 7 mil (0.18 mm) to 20 mil (0.5 mm).

Flame retardancy was determined according to UL 94.

Melt Volume Rate (MVR) was determined at 300° C. using a 1.2-kilogram weight, in accordance with ASTM 1238.

Izod Notched Impact Strength is used to compare the impact resistances of plastic materials. Izod Impact was determined using a 3.2 mm thick, molded Izod notched impact (INI) bar per ASTM D 256.

Vicat Softening Temperature is a measure of the temperature at which a plastic starts to soften rapidly. Results were obtained according to ASTM D 1525.

Heat Deflection Temperature (HDT) is also used to compare heat resistance of plastic materials. Results were determined using a 3.2 mm thick, molded bar per ASTM D648.

Tensile properties such as Tensile Strength and Tensile Elongation to break were determined according to ASTM D 638.

Examples 1-7

Examples 1-7 had the compositions shown in Table 2. Amounts shown are based on 100 parts by weight polycarbonate. The compositions also contained 1.1 parts by weight of a color concentrate and 0.06 parts by weight of a stabilizer. The compositions were extruded to form films having a thickness of 0.43 mm and tested for flame retardancy according to UL94.

TABLE 2

|  | 1* | 2* | 3* | 4* | 5* | 6 | 7* |
| --- | --- | --- | --- | --- | --- | --- | --- |
| PC-1 | 50.00 | 50.00 | 50.00 | 50.00 | 50.00 | 50.00 | 500.0 |
| PC-2 | 50.00 | 50.00 | 50.00 | 50.00 | 50.00 | 50.00 | 50.00 |
| Rimar salt | 0.52 | 0.10 | 0.52 | — | 0.10 | 0.52 | — |
| TSAN | 0.35 | 0.35 | 0.35 | 0.35 | 0.35 | 0.35 | 0.35 |
| Talc 1 | — | 5.00 | 5.00 | 5.00 | — | — | — |
| Talc 2 (fine talc) | — | — | — | — | 5.00 | 5.00 | 5.00 |
| Acid 1 | — | — | — | — | 0.12 | 0.12 | 0.12 |
| KSS | — | — | — | 0.05 | — | — | 0.05 |
| NaTS | — | — | — | 0.02 | — | — | 0.02 |
| UL94 FR Rating at 0.43 mm | V1 | F | V0 | F | F | V0 | F |

*Comparative Example

Example 1 shows that a V0 rating at 0.43 mm thickness cannot be obtained in the absence of talc. Example 3, by comparison, contains talc and the composition achieves a V0 rating although this example is comparative because it lacks acid. The acid is not essential to flame retardance but is important to maintaining the melt volume rate of the composition as will be shown below. Example 6 also achieves a V0 rating with both acid and talc. Examples 2 and 5 shows that the amount of Rimar salt is important to achieving a V0 rating—even in the presence of talc. Examples 4 and 7 show that Rimar salt cannot be replaced by KSS and NaTS. The amount of KSS and NaTs used in the Examples 4 and 7 is the amount of these flame retardants that is comparable to the amount of Rimar salt used in Example 6.

Examples 8-16

Examples 8-16 had the composition shown in Table 3. Amounts shown are based on 100 parts by weight of polycarbonate. The compositions also contained 0.30 parts by weight of a coloring agent and 0.06 parts by weight of a stabilizer.

TABLE 3

|  | 8* | 9* | 10* | 11* | 12* | 13* | 14* | 15* | 16* |
| --- | --- | --- | --- | --- | --- | --- | --- | --- | --- |
| PC-1 | 50.00 | 50.00 | 50.00 | 50.00 | 50.00 | 50.00 | 50.00 | 50.00 | 50.00 |
| PC-2 | 50.00 | 50.00 | 50.00 | 50.00 | 50.00 | 50.00 | 50.00 | 50.00 | 50.00 |
| TSAN | 0.35 | 0.35 | 0.35 | 0.35 | 0.35 | 0.35 | 0.35 | 0.35 | 0.35 |
| Talc 2 | 5.00 | 5.00 | 5.00 | 5.00 | 5.00 | 5.00 | 5.00 | 5.00 | 5.00 |
| Rimar salt | 0.40 | 0.30 | 0.30 | 0.20 | 0.20 | 0.30 | 0.30 | 0.20 | 0.20 |
| NaTS | — | 0.30 | 0.45 | 0.30 | 0.40 | — | — | — | — |
| Acid 1 | 0.12 | 0.12 | 0.12 | 0.12 | 0.12 | 0.12 | 0.12 | 0.12 | 0.12 |
| KSS | — | — | — | — | — | 0.30 | 0.45 | 0.30 | 0.40 |
| UL94 FR Rating at 0.43 mm | V1 | F | F | F | F | F | F | F | F |

*Comparative Example

These comparative examples further demonstrate the importance of the perfluoroalkane sulfonate salt. While examples 3 and 6, shown above, demonstrate that compositions containing 0.5 parts by weight of Rimar salt can achieve a V0 rating at a thickness of 0.43 mm, the above examples show that less Rimar salt, even when augmented by other sulfonate salts to a combined amount greater than 0.5 parts by weight, cannot achieve a V0 rating.

Examples 17-19

Examples 17-19 had the composition shown in Table 4. Amounts shown are based on 100 parts by weight of the composition. The compositions also contained 0.30 parts by weight of a coloring agent and 0.06 parts by weight of a stabilizer.

TABLE 4

|  | Unit | 17 | 18* | 19* |
|---|---|---|---|---|
| PC-1 |  | 47.00 | 47.00 | 47.00 |
| PC-2 |  | 47.00 | 47.00 | 47.00 |
| Rimar salt |  | 0.50 | 0.40 | 0.30 |
| TSAN |  | 0.35 | 0.35 | 0.35 |
| Talc 2 |  | 5.00 | 5.00 | 5.00 |
| Acid 1 |  | 0.12 | 0.12 | 0.12 |
| Properties/Methods |  |  |  |  |
| UL 94 Rating @ 0.5 mm | — | V0 | V0-V1 | V0-V1 |
| UL 94 Rating @ 0.43 mm |  | V0 | — | — |
| UL 94 Rating @ 0.38 mm |  | V0 | — | — |
| UL 94 Rating @ 0.25 mm |  | VTM0 | — | — |
| UL 94 Rating @ 0.17 mm |  | VTM0 | — | — |
| Notched Impact Strength, 23 C. | J/m | 1090 | — | — |
| Ductility | % | 100 | — | — |
| Modulus of Elasticity | MPa | 2704 | — | — |
| Stress at Yield | MPa | 62 | — | — |
| Stress at Break | MPa | 67 | — | — |
| Elongation at Yield | % | 6 | — | — |
| Elongation at Break | % | 95 | — | — |
| HDT, 1.82 MPa, 3.2 mm | ° C. | 131 | — | — |
| VST, 50N, 120 C./h | ° C. | 151 | — | — |

*Comparative Example

Example 17, when compared to Examples 18 and 19, shows the surprising and dramatic impact of a small amount of Rimar salt. Here, a difference of 0.1 weight percent makes the difference between a composition which has a V0 or VTM0 rating at 0.17 mm to 0.5 mm and a composition which is not even reliably V0 at 0.5 mm thickness.

Examples 20-23

Examples 20-23 had the composition shown in Table 5. Amounts shown are based on 100 parts by weight of polycarbonate. The compositions also contained 1.10 parts by weight of a coloring agent and 0.06 parts by weight of a stabilizer.

TABLE 5

|  | Units | 20* | 21* | 22* | 23 |
|---|---|---|---|---|---|
| PC-1 |  | 50.00 | 50.00 | 50.00 | 50.00 |
| PC-2 |  | 50.00 | 50.00 | 50.00 | 50.00 |
| Rimar salt |  | 0.10 | 0.52 | 0.10 | 0.52 |
| TSAN |  | 0.35 | 0.35 | 0.35 | 0.35 |
| Talc 1 |  | 5.00 | 5.00 | — | — |
| Talc 2 |  | — | — | 5.00 | 5.00 |
| Acid 1 |  | — | — | 0.12 | 0.12 |
| MVR, 300° C., 1.2 Kg, 360 s | cm³/10 min | 10.9 | 9.9 | 4.69 | 4.74 |
| UL94 Rating @ 0.43 mm |  | F | V0 | F | V0 |

*Comparative Examples

Examples 20-23 demonstrate the effect of the amount of Rimar salt on the composition.

Examples 24-29

Examples 24-29 had the composition shown in Table 6. Amounts shown are based on 100 parts by weight of the composition. The compositions also contained 0.30 parts by weight of a coloring agent and 0.06 parts by weight of a stabilizer.

TABLE 6

| Item Description | Unit | 24* | 25 | 26 | 27 | 28 | 29 |
|---|---|---|---|---|---|---|---|
| PC-1 |  | 47.00 | 47.00 | 47.00 | 47.00 | 47.00 | 47.00 |
| PC-2 |  | 47.00 | 47.00 | 47.00 | 47.00 | 47.00 | 47.00 |
| Rimar salt |  | 0.50 | 0.50 | 0.50 | 0.50 | 0.50 | 0.50 |
| TSAN |  | 0.35 | 0.35 | 0.35 | 0.35 | 0.35 | 0.35 |
| Talc 2 |  | 5.00 | 5.00 | 5.00 | 5.00 | 5.00 | 5.00 |
| Acid 1 |  | 0 | 0.06 | 0.09 | 0.12 | 0.15 | 0.18 |
| Before aging |  |  |  |  |  |  |  |
| MVR, 300° C., 1.2 Kg, 360 s | cm³/10 min | 27.3 | 7.2 | 5.0 | 5.0 | 5.3 | 5.4 |
| Mw | Daltons | 45205 | 58438 | 61741 | 61838 | 61275 | 61110 |
| Modulus of Elasticity | MPa | 2784 | 2728 | 2700 | 2704 | 2737 | 2723 |
| Stress at Yield | MPa | 63 | 61 | 61 | 62 | 61 | 61 |
| Thermo-aging at 120° C. for 1000 hours |  |  |  |  |  |  |  |
| MVR, 300° C., 1.2 Kg, 360 s | cm³/10 min | 47.6 | 7.3 | 5.5 | 5.1 | 5.3 | 5.4 |
| Mw | Daltons | 44805 | 57783 | 60643 | 61412 | 60687 | 60236 |
| Modulus of Elasticity | MPa | 2923 | 2814 | 2804 | 2819 | 2809 | 2825 |

TABLE 6-continued

| Item Description | Unit | 24* | 25 | 26 | 27 | 28 | 29 |
|---|---|---|---|---|---|---|---|
| Stress at Yield | MPa | 77 | 73 | 73 | 73 | 73 | 73 |
| Hydro-aging at 80° C., 85% Relative Humidity for 1000 hours | | | | | | | |
| MVR, 300° C., 1.2 Kg, 360 | scm³/10 min | 24.0 | 8.3 | 6.7 | 6.8 | 6.7 | 7.4 |
| Mw | Daltons | 44056 | 55971 | 57279 | 57147 | 56610 | 56363 |
| Modulus of Elasticity | MPa | 2942 | 2844 | 2827 | 2850 | 2864 | 2857 |
| Stress at Yield | MPa | 68 | 65 | 65 | 65 | 65 | 65 |

*Comparative Example

The change in the melt volume rate after aging further demonstrates the impact of the acid on the composition. Example 24, which contains no acid, shows a dramatic increase in the melt volume rate after thermo-aging (aging in an oven). Incorporation of acid minimizes the change in melt volume rate, particularly after thermo-aging.

Examples 30-33

Examples 30-33 had the composition shown in Table 7. Amounts shown are based on 100 parts by weight of polycarbonate. The compositions also contained 1.10 parts by weight of a coloring agent and 0.06 parts by weight of a stabilizer.

TABLE 7

| | 30* | 31* | 32* | 33* |
|---|---|---|---|---|
| PC-Si | — | — | 5.00 | 5.00 |
| Cyclic siloxance | 0.25 | 0.25 | — | — |
| PC-1 | 50.00 | — | 50.00 | — |
| PC-3 | — | 50.00 | — | 50.00 |
| PC-2 | 50.00 | — | 45.00 | — |
| PC-4 | — | 50.00 | — | 45.00 |
| Rimar salt | 0.52 | 0.52 | 0.52 | 0.52 |
| TSAN | 0.35 | 0.35 | 0.35 | 0.35 |
| UL94 FR Rating at 0.5 mm | F | F | F | F |

*Comparative Example

These comparative examples show that other flame retardant combinations such as Rimar salt with cyclic siloxane and Rimar salt with polycarbonate-polysiloxane block copolymer do not have sufficient flame retardance at a thickness of 0.5 mm.

Examples 34-37

Examples 34-37 had the composition shown in Table 8. Amounts shown are based on 100 parts by weight of polycarbonate.

TABLE 8

| | 34* | 35* | 36* | 37* |
|---|---|---|---|---|
| PC-Si | 83.00 | 83.00 | 83.00 | 83.00 |
| PC-4 | 17.00 | 17.00 | 17.00 | 17.00 |
| stabilizer | 0.06 | 0.06 | 0.06 | 0.06 |
| TSAN | 0.50 | 0.50 | 0.35 | 0.35 |
| Talc 1 | 5.00 | — | 5.00 | — |
| Talc 2 | — | 5.00 | — | 5.00 |
| Acid 1 | — | 0.12 | — | 0.12 |
| KSS | 0.05 | 0.05 | 0.05 | 0.05 |
| NaTS | 0.02 | 0.02 | 0.02 | 0.02 |
| UL94 FR Rating @ 0.43 mm | F | F | F | F |

*Comparative Example

Examples 34-37 show that the combination of polycarbonate-siloxane block copolymer and other sulfonate salts do not achieve a V0 flame retardant rating at a thickness of 0.43 mm.

Examples 38-40

Examples 38-40 had the composition shown in Table 9. Amounts shown are in weight percent based on the total weight of the composition. These compositions also contained 0.06 weight percent of a stabilizer.

TABLE 9

| | 38 | 39* | 40* |
|---|---|---|---|
| PC-1 | 47 | 47 | 47 |
| PC-2 | 47 | 47 | 47 |
| TSAN | 0.35 | 0.35 | 0.35 |
| Talc 2 | 5 | 5 | 5 |
| Acid 1 | 0.12 | — | — |
| p-toluenesulfonic acid | — | 0.12 | 0.15 |
| Rimar salt | 0.5 | 0.5 | 0.5 |
| MVR, 300 C., 1.2 Kg, 360 s | 5.7 | 14.7 | 9.9 |

*Comparative example

In Examples 39-40 p-toluenesulfonic acid was used as an organic acid replacement for the inorganic acid. Examples 39 and 40 have a higher melt volume rate than Example 38, indicating a greater degradation of the polycarbonate as a result of poor neutralization of compositional impurities.

The singular forms "a," "an," and "the" include plural referents unless the context clearly dictates otherwise. The endpoints of all ranges reciting the same characteristic are combinable and inclusive of the recited endpoints. All references are incorporated herein by reference. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. The modifier "about" used in connection with a quantity is inclusive of the stated value and has the meaning dictated by the context (e.g., includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

We claim:

1. A thermoplastic composition comprising
80 to 95 weight percent of a polycarbonate;
3 to 7 weight percent of a talc having an average particle size less than or equal to 5.0 micrometers;
an inorganic acid or acid salt comprising a phosphorous containing oxy-acid, a mono zinc phosphate, a mono calcium phosphate, a mono natrium phosphate, or a combination comprising one or more of the foregoing;
0.10 to 0.50 weight percent of an encapsulated fluoropolymer; and
greater than 0.40 to 1.00 weight percent of a perfluoroalkyl sulfonate salt,
wherein weight percent is based on the total weight of the composition and the weight ratio of inorganic acid or acid salt to talc is 0.01 to 0.04;
wherein the thermoplastic composition has a flame retardancy rating of V0 when in the form of a sheet having a thickness of 0.43 mm according to UL94; and
wherein the thermoplastic composition is free of an aromatic phosphate ester and a polycarbonate-siloxane block copolymer.

2. The thermoplastic composition of claim 1, wherein the average particle size less than or equal to 3.0 micrometers.

3. The thermoplastic composition of claim 1, comprising 4 to 7 weight percent of the talc.

4. The thermoplastic composition of claim 1, comprising 0.20 to 0.45 weight percent of the encapsulated fluoropolymer.

5. The thermoplastic composition of claim 1, wherein the perfluoroalkyl sulfonate salt is a perfluorobutane sulfonate salt.

6. The thermoplastic composition of claim 1, comprising 0.45 to 0.80 weight percent of the perfluoroalkyl sulfonate salt.

7. The thermoplastic composition of claim 1, wherein the inorganic acid or acid salt comprises the phosphorous containing oxy-acid; wherein the phosphorous containing oxy-acid has a formula of $H_m P_t O_n$, wherein m and n are each 2 or greater and t is 1 or greater.

8. The thermoplastic composition of claim 1, wherein the inorganic acid or acid salt comprises the phosphorous containing oxy-acid; and wherein the phosphorous containing oxy-acid comprises phosphoric acid, phosphorous acid, hypophosphorous acid, hypophosphoric acid, phosphinic acid, phosphonic acid, metaphosphoric acid, hexametaphosphoric acid, thiophosphoric acid, fluorophosphoric acid, difluorophosphoric acid, fluorophosphorous acid, difluorophosphorous acid, fluorohypophosphorous acid, fluorohypophosphoric acid, or a combination comprising at least one of the foregoing.

9. The thermoplastic composition of claim 1, comprising 4 to 7 weight percent of the talc; 0.20 to 0.45 weight percent of the encapsulated fluoropolymer; and 0.45 to 0.80 weight percent of the perfluoroalkyl sulfonate salt.

10. The thermoplastic composition of claim 1, having a flame retardancy rating of V0 when in the form of a sheet having a thickness of 0.38 mm according to UL94.

11. The thermoplastic composition of claim 1, wherein the thermoplastic composition has an HDT greater than or equal to 130 degrees Celsius according to ASTM D648.

12. The thermoplastic composition of claim 1, wherein the thermoplastic composition has a notched Izod impact strength greater than or equal to 1000 Joules/meter according to ASTM D256 at 23 degrees Celsius.

13. A film comprising the thermoplastic composition of claim 1.

14. The film of claim 13, wherein the film is a multi-layer film.

15. The film of claim 13 having a thickness of 0.1 to 0.5 millimeters.

16. The thermoplastic composition of claim 1, further comprising a colorant.

* * * * *